United States Patent
Cooper et al.

(10) Patent No.: US 7,742,697 B2
(45) Date of Patent: Jun. 22, 2010

(54) EFFICIENT USE OF TRUSTED THIRD PARTIES FOR ADDITIONAL CONTENT-SHARING SECURITY

(75) Inventors: Michael J. Cooper, Marietta, GA (US); Charles S. Moore, Langhorne, PA (US); John L. Moran, Uxbridge, MA (US); Robert J. Thompson, Horsham, PA (US)

(73) Assignee: General Instrument Corporation, Horsham, PA (US)

(*) Notice: Subject to any disclaimer, the term of this patent is extended or adjusted under 35 U.S.C. 154(b) by 664 days.

(21) Appl. No.: 11/470,034

(22) Filed: Sep. 5, 2006

(65) Prior Publication Data

US 2008/0056713 A1  Mar. 6, 2008

(51) Int. Cl.
*H04B 10/08* (2006.01)
*H04B 17/00* (2006.01)

(52) U.S. Cl. .................. 398/25; 398/33; 398/38
(58) Field of Classification Search ............... 398/66, 398/67, 68, 69, 70, 71, 72, 58, 59, 57, 25, 398/33, 38
See application file for complete search history.

(56) References Cited

U.S. PATENT DOCUMENTS

| | | | |
|---|---|---|---|
| 5,251,324 A | 10/1993 | McMullan | |
| 5,631,846 A | 5/1997 | Szurkowski | |
| 5,862,451 A * | 1/1999 | Grau et al. | 725/116 |
| 5,939,887 A | 8/1999 | Schmidt et al. | |
| 5,943,604 A | 8/1999 | Chen et al. | |
| 6,032,019 A | 2/2000 | Chen et al. | |
| 6,272,150 B1 | 8/2001 | Hrastar et al. | |
| 6,278,730 B1 | 8/2001 | Tsui et al. | |
| 6,321,384 B1 | 11/2001 | Eldering | |
| 6,334,219 B1 | 12/2001 | Hill et al. | |
| 6,377,552 B1 | 4/2002 | Moran, III et al. | |
| 6,434,583 B1 | 8/2002 | Dapper et al. | |
| 6,559,756 B2 | 5/2003 | Al-Araji | |
| 6,570,913 B1 | 5/2003 | Chen | |
| 6,606,351 B1 | 8/2003 | Dapper | |
| 6,700,875 B1 | 3/2004 | Schroeder et al. | |
| 6,711,134 B1 | 3/2004 | Wichelman et al. | |
| 6,741,947 B1 | 5/2004 | Wichelman et al. | |
| 6,757,253 B1 | 6/2004 | Cooper et al. | |
| 6,772,437 B1 | 8/2004 | Cooper et al. | |
| 6,961,370 B2 | 11/2005 | Chappell | |
| 6,985,437 B1 | 1/2006 | Vogel | |
| 7,054,554 B1 * | 5/2006 | McNamara et al. | 398/30 |
| 7,099,580 B1 * | 8/2006 | Bulbul | 398/9 |

(Continued)

OTHER PUBLICATIONS

PCT International Search Report and Written Opinion for PCT/US07/71755, Issued on Feb. 29, 2008.

*Primary Examiner*—M. R. Sedighian
(74) *Attorney, Agent, or Firm*—Larry T. Cullen

(57) ABSTRACT

Network elements are identified as being connected to optical nodes by instructing two network elements in a spectrum group of the CMTS to transmit at frequencies $f_1$ and $f_2$, respectively. Frequencies $f_1$ and $f_2$ are selected such that they produce intermodulation distortions (intermods) in the laser transmitter at $f_3$ when combined. If intermods are produced which exceed a predetermined threshold, then the two network elements are determined to be on the same node. If the total power of the signal by the laser transmitter exceeds an impact threshold, then the test is stopped and new network elements are selected for testing.

14 Claims, 4 Drawing Sheets

U.S. PATENT DOCUMENTS

| | | |
|---|---|---|
| 2001/0055319 A1 | 12/2001 | Quigley et al. |
| 2003/0028898 A1 | 2/2003 | Howald |
| 2003/0149991 A1 | 8/2003 | Reidhead et al. |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0185176 A1 | 10/2003 | Lusky et al. |
| 2003/0212999 A1 | 11/2003 | Cai |
| 2004/0062548 A1* | 4/2004 | Obeda et al. ................... 398/25 |
| 2004/0073937 A1 | 4/2004 | Williams |
| 2005/0025145 A1 | 2/2005 | Rakib et al. |
| 2005/0039103 A1 | 2/2005 | Azenkot et al. |
| 2005/0058082 A1 | 3/2005 | Moran et al. |
| 2005/0122996 A1 | 6/2005 | Azenkot et al. |
| 2005/0183130 A1 | 8/2005 | Sadja et al. |
| 2005/0198688 A1 | 9/2005 | Fong |
| 2005/0226161 A1 | 10/2005 | Jaworski |
| 2007/0189770 A1* | 8/2007 | Sucharczuk et al. ........... 398/66 |

* cited by examiner

EFFICIENT USE OF TRUSTED THIRD PARTIES FOR ADDITIONAL CONTENT-SHARING SECURITY

FIELD OF THE INVENTION

This disclosure is directed toward mapping terminal network devices to associated optical nodes. More specifically, this disclosure is directed toward an automated approach to mapping terminal network devices to associated optical nodes.

BACKGROUND OF THE INVENTION

Coaxial cable television systems have been in widespread use for many years and extensive networks have been developed. The extensive and complex networks are often difficult for a cable operator to manage and monitor. A typical cable network generally contains a headend which is usually connected to several nodes which provide access to an IP or ISPN network. The headend also interfaces with a cable modem termination system (CMTS) which typically contains several receivers, each receiver typically connects to several nodes each of which connect to several network elements, such as modems, MTA (media terminal adaptors) and set top boxes of many subscribers, e.g., a single receiver may be connected to hundreds of network elements.

The standard architecture for an HFC cable plant is a tree and branch structure where terminal network elements (MTA, cable modem, set top box, etc.) reside on various optical nodes. Nodes may be combined and serviced by common components at the headend. Typically, the method for tracking which terminal devices are attached to which optical node is a manual process by which as the customer services are enabled, the operator manually resolves (via out of date and often inaccurate maps which were also manually entered and prone to the shortcomings of human data entry) the specific node that the user is attached to and enters this into the customer management database.

Information of the connections to a node is valuable to resolving physical layer communications issues, performing periodic HFC plant maintenance, and planning future service expansions. However, when the data is inaccurate, it can often lead to misdiagnosis of issues, excessive costs associated with maintenance, and prolonged new deployments which jeopardize customer expectations. In addition, as communication traffic increases or new services are deployed the need to understand the loading of individual nodes becomes important, particularly if the number of users on each node must be reallocated, e.g. to split the user loads on a node.

SUMMARY OF THE INVENTION

This disclosure provides a solution to the problems of the prior art by providing an automated methodology for resolving which optical node each device resides on without the need for placing test instrumentation remotely in the cable plant.

In accordance with the principles of the invention, an apparatus for identifying network elements connected to an optical node may comprise: a receiver configured to receive communications from a first network element at a first frequency $f_1$ and a second network element at a second frequency $f_2$ at the same time, the first frequency $f_1$ and the second frequency $f_2$ being selected so that $f_1+f_2$ produce a third frequency $f_3$ which produces intermodulation disturbances (herein referred to as intermod or IMD) in a transmitting laser; a fast Fourier transform (FFT) module configured to identify the third frequency $f_3$; a power monitoring unit which is configured to measure the power in a signal; and a microprocessor configured to determine that the first network element and the second network element are connected to the same optical node if the third frequency $f_3$ is detected to have more power than a predetermined power spectral data threshold.

In accordance with an apparatus of the invention, the microprocessor may be configured to select network elements as the first network element and another network element as the second network element, and to instruct the selected network elements to transmit on the first frequency $f_1$ and the second frequency $f_2$ at the same time, respectively.

In accordance with an apparatus of the invention, the microprocessor may be configured to test each network element in a spectrum group of a cable modem termination system by selecting each network element as the first or second network element.

In accordance with an apparatus of the invention, the microprocessor is configured to determine that the first network element and the second network element are not on the same node if the power of the signal, which is not only $f_3$, is greater than an intermod impact threshold.

In accordance with an apparatus of the invention, the microprocessor is configured to instruct the first network element and the second network element to transmit at predetermined power levels.

In accordance with an apparatus of the invention, the microprocessor is configured to instruct at least one of the first network element or the second network element to transmit at an increased power level if the third frequency $f_3$ is not detected to have more power than a predetermined power spectral data threshold.

In accordance with the principles of the invention, a method of identifying network elements connected to an optical node may comprise: instructing a first network element to transmit at a first frequency $f_1$ and a second network element at a second frequency $f_2$ at the same time, the first frequency $f_1$ and the second frequency $f_2$ being selected so that $f_1+f_2$ produce a third frequency $f_3$ which produces intermodulation disturbances in a transmitting laser; determining if the third frequency is produced at a power level greater than a predetermined power threshold; and determining that the first network element and the second network element are on the same node if the third frequency is produced at a power level greater than a predetermined power threshold.

In accordance with a method of the invention, the first network element and the second network element may be selected from network element identified as being in a spectrum group of a cable modem termination system.

A method of the invention, may further comprise the step of determining the power level of a received signal and, wherein the first network element and the second network element are determined not to be on the same node if the power of the received signal, which is not only $f_3$, is greater than an intermod impact threshold.

A method of the invention, may further comprise the step of increasing a transmission power of at least one of the first network element or the second network element if the power level of $f_3$ is not greater than the predetermined power threshold.

In accordance with the principles of the invention, a computer readable medium carrying instructions for a computer to perform a method of identifying network elements connected to an optical node comprising: instructing a first network element to transmit at a first frequency $f_1$ and a second network element at a second frequency $f_2$ at the same time, the first frequency $f_1$ and the second frequency $f_2$ being selected so that $f_1+f_2$ produce a third frequency $f_3$ which produces intermodulation disturbances in a transmitting laser; determining if the third frequency is produced at a power level greater than a predetermined power threshold; and determining that the first network element and the second network element are on the same node if the third frequency is produced at a power level greater than a predetermined power threshold.

In accordance with the computer readable medium the first network element and the second network element may be selected from network element identified as being in a spectrum group of a cable modem termination system.

The computer readable medium may further comprise instructions for a computer to perform the step of determining the power level of a received signal and, wherein the first network element and the second network element are determined not to be on the same node if the power of the received signal, which is not only $f_3$, is greater than an intermod impact threshold.

The computer readable medium may further comprise instructions for a computer to perform the step of increasing a transmission power of at least one of the first network element or the second network element if the power level of $f_3$ is not greater than the predetermined power threshold.

Those of skill in the art will appreciate that the automated technique of this invention allows an operator to determine which optical node each network element resides on without the need for placing test instrumentation remotely in the cable plant. In addition, the technique disclosed in the invention does not require an operator or technician to be dispatched to remote locations in the HFC network. All measurements may be made through the use of the existing terminal devices (specifically, DOCSIS terminal devices such as MTAs and cable modems) as well as headend equipment (specifically a DOCSIS CMTS). Further, the invention produces an accurate association of devices to nodes eliminating traditional error sources such as human data-entry and out of date plant maps.

BRIEF DESCRIPTION OF THE DRAWINGS

In accordance with the principles of the invention.

DETAILED DESCRIPTION OF THE INVENTION

Figure 1:
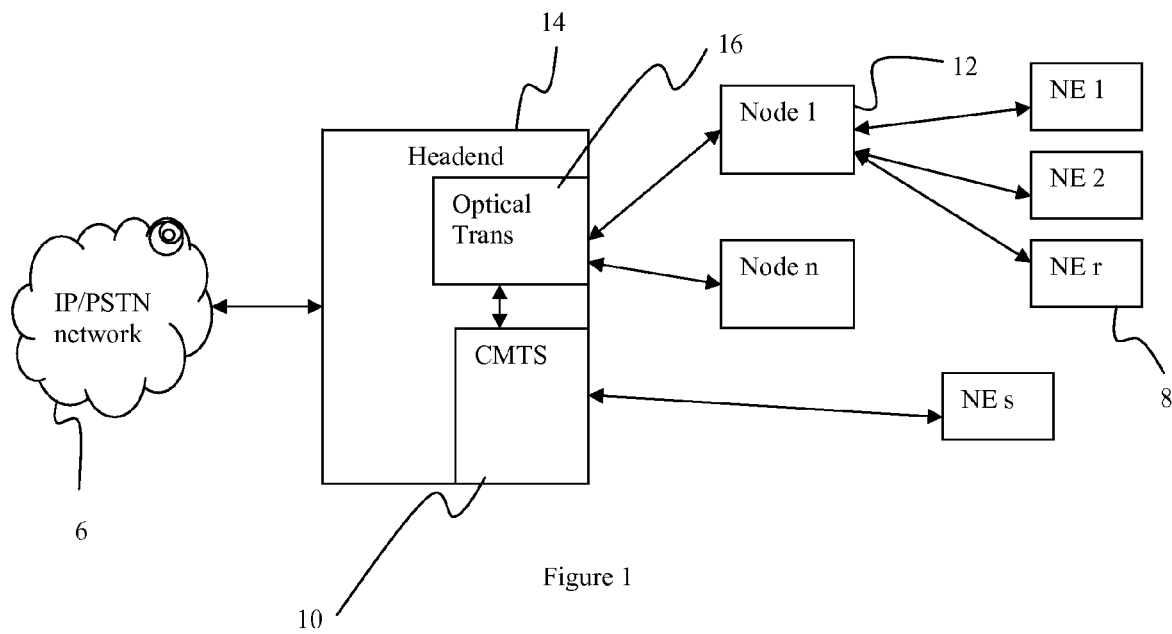
FIG. 1 illustrates an exemplary network in accordance with the principles of the invention.

This disclosure provides a technique for automated grouping of terminal network elements together which all reside on the same optical node. The basic premise of this technique is that we can force the network elements to transmit at the same time on different frequencies; the mixing of these two simultaneous signals will generate a predictable mixing product if the two network elements are located on the same optical node and will not generate a mixing product if they are on different nodes. For optimal results, the modems must transmit at exactly same time on different channels, and the power of two signals must be adequate to trigger a detectable intermodulation distortion ("intermod") as measured by a fast Fourier transform measurement, or other frequency selected power measurement, but not so strong as to impact active services.

Adequate margin should also be available to allow the addition of 2 DOCSIS (Data Over Cable System Interface Specification) channels. This margin may be determined by first estimating the total power of the current upstream loading via an FFT measurement or other frequency selected power measurement, then adding a test channel at the same level of the cable modem channel and rerunning the frequency selected power measurement (e.g. FFT). If the total power increase is less than 3 dB with cable modem and test channel loading combined then the system is still functioning in a linear region and the power addition from a test channel is acceptable. Otherwise the optical link may be overdriven. The margin test should be repeated by adding the second test signal. The FFT should also be run with both test signals transmitting at the same time during the second test.

Since the test performed does not impact existing active services, an active Return Path may be providing services at the time that the operator desires to associate (group) network elements according to common optical nodes. The test may also be performed even if active services were not being provided. Also, this test selects test frequency locations based upon eliminating interference of $2^{nd}$ order intermods on active data services. We are assuming adequate margin is available such that $3^{rd}$ order products are not a problem for the active services. For example, in U.S. based cable systems, intermods are preferably considered in the 42-52 MHz region as these are produced by the laser as opposed to those below 42 MHz which might be caused by the laser or might be a product of the RF amplifiers. Cable systems of other countries, e.g. Japan and Europe, may have different frequency regions in which intermods are considered. The lack of diplex filters in the path following the optical link means that intermods above 42 MHz must be from the optical link. Also, the approach may preferably use 800 kHz bandwidth since narrow bandwidths minimize the amount of clean spectrum required within the return path and many modems have problems with the 400 and 200 kHz bandwidths.

FIG. 1 illustrates an exemplary network in which a plurality of terminal network elements 8 (e.g. cable modems, set top boxes, televisions equipped with set top boxes, or any other element on a network such as an HFC network) are connected to a cable modem termination system (CMTS) 10 located in a headend 14 through one or more taps (not shown). In an exemplary arrangement, headend 14 also contains an optical transceiver 16 which provides optical communications through an optical fiber to a plurality of nodes 12, which connect to a plurality of network elements 8. CMTS 10 may also directly connect to a plurality of network elements 8 via RF communications. Headend 14 connects to an IP or PSTN network 6. Those of skill in the art will appreciate that there may be a plurality of nodes 12 connected to a headend, and a headend may contain a plurality of CMTS units, each of which contain a plurality of receivers (e.g. 8 receivers) each of which communicate with a plurality (e.g. 100) of network elements 8. Each node 12 preferably contains an optical transceiver which includes an optical receiver which receives downstream optical communication signals from headend 14 and converts the received downstream optical signals into downstream RF communication signals and transmitted to network elements 8. Upstream communication signals from network element 8 are received by RF transceivers in the nodes and converted into upstream optical communication signals and transmitted to headend 14.

Figure 2:
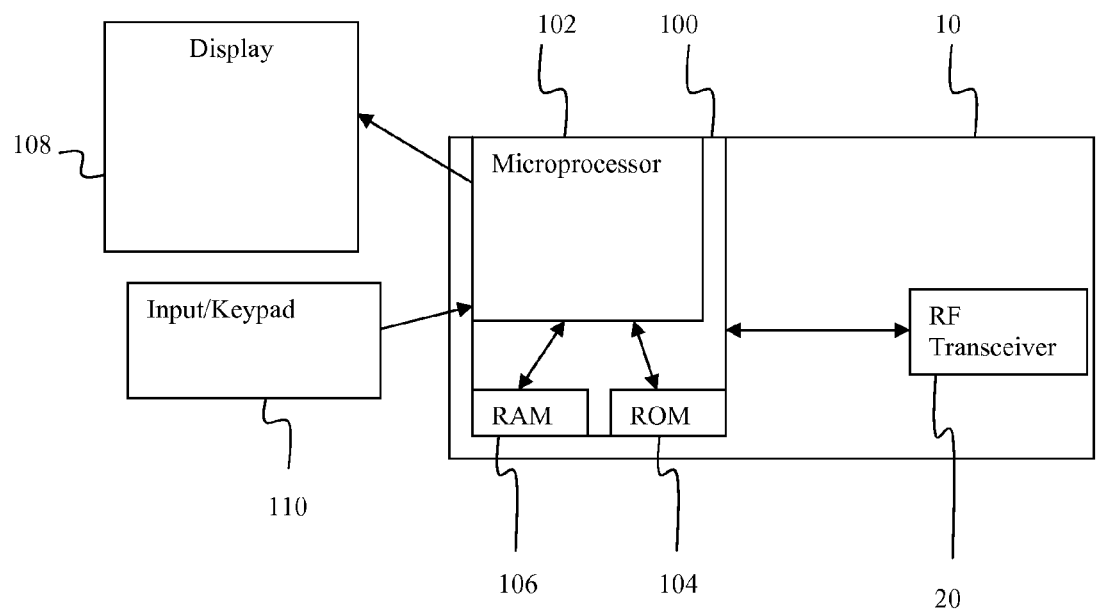
FIG. 2 illustrates an exemplary CMTS architecture in accordance with the principles of the invention.

FIG. 2 illustrates a logical architecture of an exemplary CMTS 10. As illustrated in FIG. 2, CMTS 10 may contain a processing unit 100 which may access a RAM 106 and a ROM 104, and may control the operation of the CMTS 10 and RF communication signals to be sent by the network elements 8 to the CMTS. Processing unit 100 preferably contains a microprocessor 102 which may receive information, such as instructions and data, from a ROM 104 or RAM 106. Processing unit 100 is preferably connected to a display 108, such as a CRT or LCD display, which may display status information such as whether a station maintenance (SM) is being performed or an unregistered receiver is eligible for load balancing. An input keypad 110 may also be connected to processing unit 100 and may allow an operator to provide instructions, processing requests and/or data to processor 100.

RF transceiver (transmitter/receiver) 20 preferably provides bi-directional communication with a plurality of network elements 8 through a plurality of network taps (not shown). Those of skill in the art will appreciate that CMTS 10 may contain a plurality of transceivers, e.g. 8 transceivers. Each RF transceiver may support over 100 network elements. Transceiver 20, may be any suitable transceiver, such as a Broadcom 3140 receiver (transceiver). The communication characteristics of each transceiver 20 may be stored on ROM 104 or RAM 106, or may be provided from an external source, such as headend 14. RAM 104 and/or ROM 106 may also carry instructions for microprocessor 102.

Figure 3:
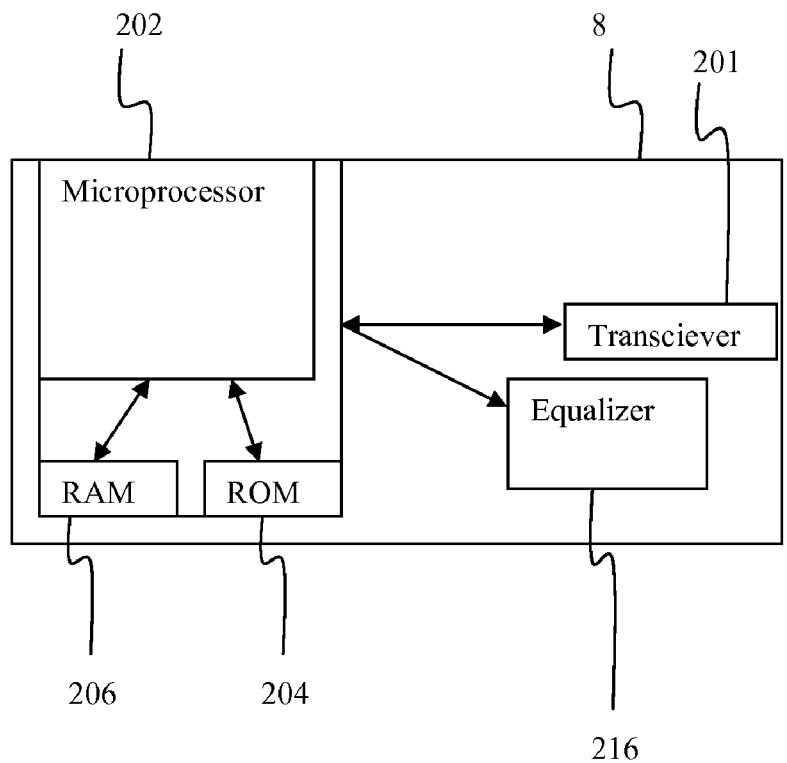
FIG. 3 illustrates an exemplary architecture of a network element which may communicate with an exemplary CMTS of the present invention.

FIG. 3 illustrates an exemplary network element 8, such as a cable modem. Network element 8 preferably contains a processor 202 which may communicate with a RAM 206 and ROM 204, and which controls the general operation of the network element, including the pre-equalization parameters and preamble lengths of communications sent by the network element in accordance with instructions from the CMTS 10. Network element 8 also contains a transceiver 201 (which includes a transmitter and receiver) which provides bidirectional RF communication with CMTS 10. Network element 8 may also contain an equalizer unit 216 which may equalize the communications to CMTS 10.

Figure 4:
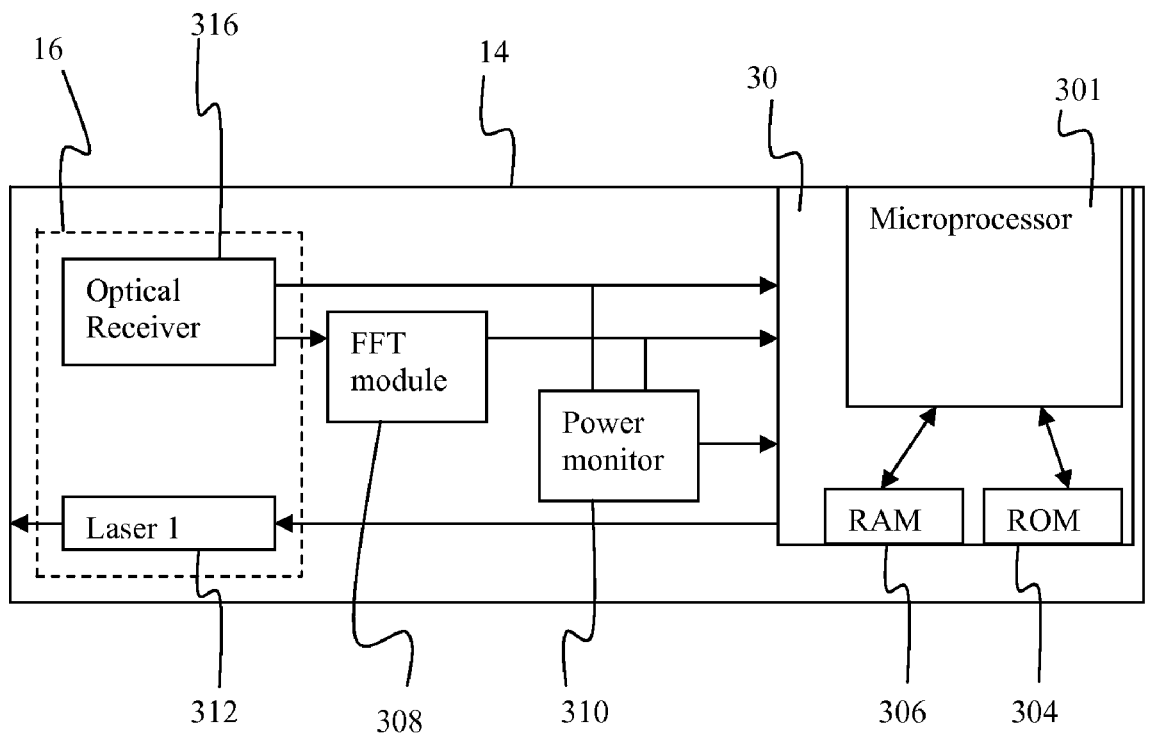
FIG. 4 illustrates an exemplary architecture of a headend which may contain an exemplary CMTS of the present invention.

FIG. 4 illustrates further detail of an exemplary headend 14. Headend 14 preferably contains an optical transceiver 16 which provides bidirectional communications through nodes 12 to the network elements 8. Optical transceiver preferably includes an optical receiver 316 configured to receive optical signals through an optical fiber from nodes 12. One or more laser transmitters 312 provide downstream optical communications to nodes 12 through an optical fiber. A laser transmitter may be assigned to communicate with a single or multiple nodes. A fast Fourier transform (FFT) module 308 such as a Broadcom 3140 receiver FFT, identifies frequencies in the optical signals it receives and provides desired frequencies to power monitoring unit 310. Preferably, the FFT supports different windows, and sample lengths (e.g. 256, 512, 1024, 2048) with an output of frequency of 0-81.92 MHz. Minimum resolution results from maximum window length of 2048 samples and yields a FFT cell resolution of 80 kHz. CPU 30 preferably contains a microprocessor 301 which interacts with RAM 306 and ROM 304 and controls the operation of the headend unit and preferably implements the method illustrated in FIG. 5.

Optical receivers 316 are preferably configured to receive the optical signals received from nodes 12 and convert them into electrical signals. Optical receiver 316 preferably provides the signals to the FFT module 308, where intermods may be determined, and to power monitor unit 310, where the power level in a specific frequency (such as the intermod frequency) may be measured or the total power of the signal may be measured.

Figure 5:
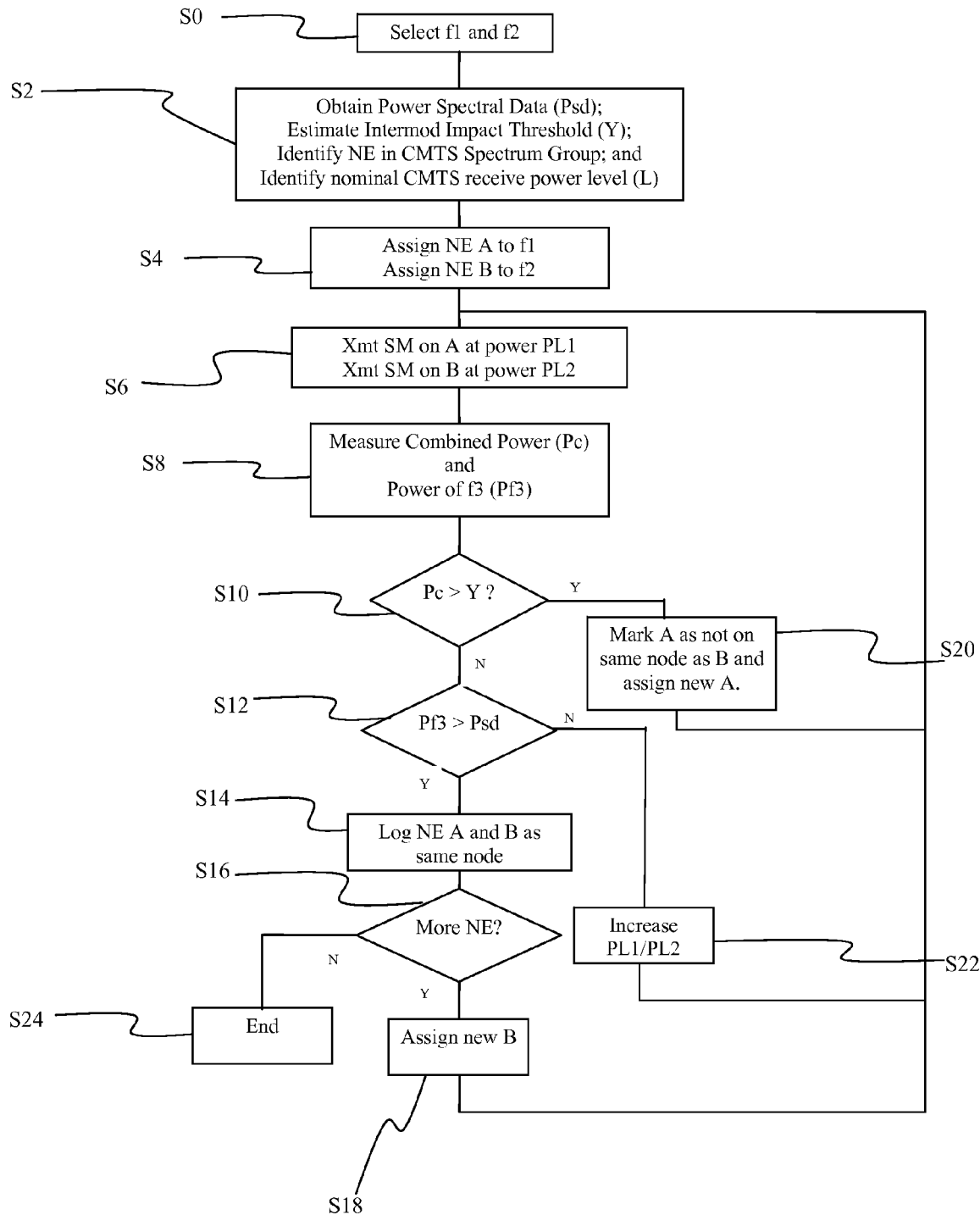
FIG. 5 illustrates an exemplary process in accordance with the principles of the present invention.

An exemplary process for automatically identifying network element grouping with optical nodes is illustrated in FIG. 5. As illustrated in step S0 of FIG. 5, two frequencies $f_1$ and $f_2$ are selected to be used by two network elements in the process. Ideally, we want to find two frequencies that the network elements, such as modems, could transmit which would produce a $2^{nd}$ order intermod between 42-52 MHz while not interfering with any active communication services. Those frequencies which are currently providing active communications services may be identified by a plurality of techniques including: 1) characterizing, via FFT or other power spectrum measurement techniques, the energy across the upstream frequency spectrum, and removing those bands which exhibit active services because of the significant presence of energy 2) extracting operating DOCSIS frequency regions from a CMTS configuration database, or 3) allowing the operator to identify active spectrum. We may select communication frequencies ($f_1$ and $f_2$) from the inactive frequency regions: a) such that we produce a test frequency $f_3$, where $f_3=f_1+f_2$ lies between 42-52 MHz, and b) the $abs(f_1-f_2)$ does not produce an appreciable signal in the active spectrum identified above. Preferably, frequencies $f_1$ and $f_2$ can be activated as DOCSIS upstream channels with default upstream CMTS receive levels without causing any significant harm to any other active services, i.e., we have adequate power operating margin and that adequate sensitivity is available from the FFT to see the intermod product prior to impacting active data services.

If we still cannot find a set of possible frequencies, a very short upstream transmission burst such as the DOCSIS station maintenance (SM) burst which completely overlaps the sampling interval for the FFT regardless of which bandwidth may be used. However, this option may have a slight impact on some active services. For the FFT sampling rate and intervals suggested above, this approach requires 20 symbols, 40 symbols, or 80 symbols for 800 kHz, 1600 kHz, or 3200 kHz respectively. We may use the station maintenance burst which is a fixed number of bytes, such as 34 bytes, which is more than adequate to produce a burst which completely overlaps the sampling interval for the FFT regardless of which bandwidth is used, e.g. the FFT sample time is generally 25 microseconds for a 2048 sample FFT. Typically, the SM will be no longer than 328 symbols (which is 192 symbols of preamble plus 136 symbols of payload) which is 300 microseconds, 150 microseconds, or 75 microseconds bursts respectively for 800 kHz, 1600 kHz, or 3200 kHz bandwidths respectively). Therefore, if it is acceptable to take the equivalent of a 300 microsecond impulse hit on one of the active services, then it would be permissible for these intermods to line up with active spectrum. In this approach, it is still necessary that at least one of the intermods exist in an unused portion of the spectrum so that the FFT power measurement could be triggered when the intermod is present. However, the second intermod could be present on an operating portion of the spectrum which could tolerate the impulse hit. The signal which is in the clean portion of the spectrum is the test frequency.

Figure 6:
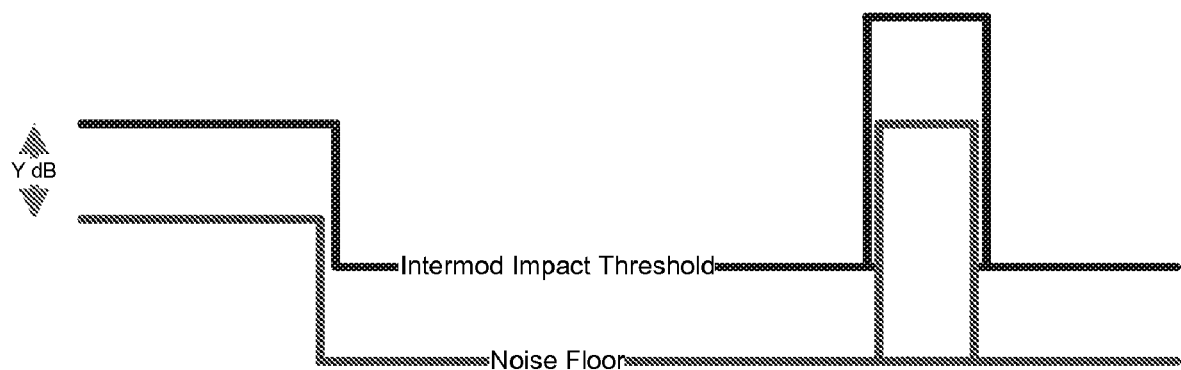
FIG. 6 illustrates an intermod impact threshold with respect to a noise floor.

As illustrated in step S2 of FIG. 5, baseline upstream power spectral data (Psd) (or noise floor) is obtained, such as from an FFT or a spectrum analyzer. As further illustrated in step S2, an estimate is obtained of an intermod impact threshold (Y dB) which is above the noise floor. The intermod impact threshold (Y db) is illustrated in FIG. 6. Those of skill in the art will appreciate that the noise floor is generally the level of noise which is commonly present in the HFC network. The intermod impact threshold (Y db) will be used to stop increasing the network element's transmit power before it is raised it too high and may cause damage to the system but is detectable above the noise floor. All of the network elements (such as modems) which are active within the CMTS spectrum group are identified. Those of skill in the art will appreciate that a spectrum group is a group of modems that share the same combining network within some portion of the plant. From the CMTS perspective, it represents which return path ports are physically coupled together. Finally, the DOCSIS protocol specifies a process whereby all network elements transmit at an appropriate power level such that the CMTS receives each network element signal at a nominal power level (L). Note, that the individual network elements may be transmitting at different power levels but losses experienced through the HFC cable plant are such that all network elements strike the CMTS receiver at the same power level, L.

As illustrated in FIG. 5, a network element in the CMTS spectrum group is chosen as element "A" and instructed to transmit at frequency $f_1$. Network element A should be picked such that it has adequate head room in which to increase it's transmit power level, i.e., network element A should not be near its maximum transmit level. Another network element in the CMTS spectrum group is chosen as element "B" and instructed to transmit at frequency $f_2$. Network elements A and B may be assigned the new frequencies using any acceptable scheme, such as DOCSIS Upstream Channel Change (UCC), or Dynamic Channel Change (DCC).

As illustrated in step S6, network elements A and B are instructed to simultaneously transmit upstream burst data such as a station maintenance (SM) message in their assigned frequencies ($f_1$ and $f_2$, respectively) at a predetermined power level $PL_1$ and $PL_2$, respectively. Those of skill in the art will appreciate that any type of upstream burst data may be used. $PL_1$ and $PL_2$ may be initially chosen such that the CMTS receiver receives each burst at the nominal receive power level, L. In this step, network elements A and B are preferably instructed to perform a station maintenance (SM) burst at exactly the same time. Those of skill in the art will appreciate that this may be done by lining up the minislots in the MAPS data for the two upstream channels associated with network elements A and B. Those of skill in the art will also appreciate that the MAP or MAPS data provide a schedule of time slots which allocates different network elements specific time intervals in which they are allowed to transmit data to the CMTS. From a CMTS software perspective, this should not be a complicated problem as the initial maintenance (IM) broadcast intervals are already aligned across all channels within a single spectrum group. The FFT processor should also be configured to trigger samples based upon the MAP minislot interval when the two SM bursts from the network elements will align. The combined power (Pc) and the power of $f_3$ ($Pf_3$) are measured, as illustrated in step S8. It may be desirable to perform steps S6 and S8 several times to eliminate the possibility that a coincidental ingress happened at the exact same instance as the SM bursts.

As illustrated in step S10, it is determined if, within the 5-42 MHz operating spectrum, whether the simultaneous transmission increased the power level significantly above the intermod impact threshold Y which was estimated in step S2. If YES in step S10, network element A is determined not to be on the same optical node as network element B since we have increased the simultaneous transmit power level to the point where active data services are impacted but have not yet encountered a corresponding intermod when mixed with network element B. Accordingly, network element A is removed from the list of network elements in the spectrum group and a new network element is assigned as network element A, step S20. Using new network element A, the steps S6-S10 are repeated.

If the combined power (Pc) level was not increased significantly above the intermod impact threshold Y, step S10, NO, then, in step S12, we determine if the simultaneous transmission increased the power level ($Pf_3$) in the FFT cell at the test frequency ($f_3$) significantly above the nominal noise level (Psd) determined from step S2 above. If step S12 is YES, then we determine that network element A and B are on the same node, step S14. As illustrated in step S16, we determine if more network elements exist to be tested, and if YES, then a new network element is assigned for the B element (step S18) and the process starting at step S6 is repeated. If NO, then the process ends, step S24. The resulting list of network element which produce the intermod provide the list of network elements on the same node. The network elements which did not produce the intermod are removed from the list for the node under analysis and analyzed for other nodes.

If the simultaneous transmission has not increased the power level in the FFT cell at the test frequency ($f_3$) significantly above the nominal noise level (Psd) determined in step S12, NO, then in step S22, the power level of network element A or B or both is increased and the process in steps S6 and beyond is repeated.

In summary, the process cycles through all modems in the spectrum group at a given power level and looks for intermods. If no intermods are seen, then the network element's transmit level power is increased and the process is repeated. We continue through this process until we find one of two conditions: 1) the network element level used by two network elements on the same optical node transmit at the same time produces a detectable intermod at the test frequency; or 2) we have increased the power level to a point where active services are being impacted (i.e., the power levels have crossed above the intermod impact threshold Y). The latter case implies that the network element is not part of the same optical node. In some cases, some network elements might not have the available headroom to increase it's transmit level very much. Therefore, when network element A is selected, it should have a significant amount of transmit head room (i.e., it should be possible to command the network element to increase it's transmit level by a significant amount (such as 15 dB)). In some cases, it may not be possible to increase both network element A and network element B's transmit levels. In this case, if we have chosen network element A correctly, we will have enough headroom from network element A alone be able to increase the power level such that the intermod will still be detected.

The processes in FIG. 5 may be implemented in hard wired devices, firmware or software running in a processor. A processing unit for a software or firmware implementation is preferably contained in the CMTS. Any of the processes illustrated in FIG. 5 may be contained on a computer readable medium which may be read by microprocessor 301. A computer readable medium may be any medium capable of carrying instructions to be performed by a microprocessor, including a CD disc, DVD disc, magnetic or optical disc, tape, silicon based removable or non-removable memory.

Those of skill in the art will appreciate that the automated technique of this invention allows an operator to determine which optical node each network element resides on without the need for placing test instrumentation remotely in the cable plant. In addition, the technique disclosed in the invention does not require an operator or technician to be dispatched to remote locations in the HFC network. All measurements may be made through the use of the existing terminal devices (specifically, DOCSIS terminal devices such as MTAs and cable modems) as well as headend equipment (specifically a DOCSIS CMTS). Further, the invention produces an accurate association of devices to nodes eliminating traditional error sources such as human data-entry and out of date plant maps.

What is claimed is:

1. An apparatus for identifying network elements connected to an optical node comprising:
   a receiver configured to receive communications from a first network element at a first frequency $f_1$ and a second network element at a second frequency $f_2$ at the same time, the first frequency $f_1$ and the second frequency $f_2$ being selected so that $f_1+f_2$ produce a third frequency $f_3$ which produces intermodulation disturbances in a transmitting laser;
   a fast Fourier transform (FFT) module configured to identify the third frequency $f_3$;
   a power monitoring unit which is configured to measure the power in a signal; and
   a microprocessor configured to determine that the first network element and the second network element are connected to the same optical node if the third frequency $f_3$ is detected to have more power than a predetermined power spectral data threshold.

2. The apparatus of claim 1, wherein the microprocessor is configured to select network elements as the first network element and another network element as the second network element, and to instruct the selected network elements to transmit on the first frequency $f_1$ and the second frequency $f_2$ at the same time, respectively.

3. The apparatus of claim 2, wherein the microprocessor is configured to test each network element in a spectrum group of a cable modem termination system by selecting each network element as the first or second network element.

4. The apparatus of claim 1, wherein the microprocessor is configured to determine that the first network element and the second network element are not on the same node if the power of the signal, which is not only $f_3$, is greater than an intermod impact threshold.

5. The apparatus of claim 1, wherein the microprocessor is configured to instruct the first network element and the second network element to transmit at predetermined power levels.

6. The apparatus of claim 5, wherein the microprocessor is configured to instruct at least one of the first network element or the second network element to transmit at an increased power level if the third frequency $f_3$ is not detected to have more power than a predetermined power spectral data threshold.

7. A method of identifying network elements connected to an optical node comprising:
   sending instructions, by a transmitter, to a first network element to transmit at a first frequency $f_1$ and a second network element at a second frequency $f_2$ at the same time, the first frequency $f_1$ and the second frequency $f_2$ being selected so that $f_1+f_2$ produce a third frequency $f_3$ which produces intermodulation disturbances in a transmitting laser;
   determining if the third frequency is produced at a power level greater than a predetermined power threshold, by a power monitoring unit; and
   determining that the first network element and the second network element are on the same node if the third frequency is produced at a power level greater than a predetermined power threshold, by a microprocessor.

8. The method of claim 7, wherein the first network element and the second network element are selected from network element identified as being in a spectrum group of a cable modem termination system.

9. The method of claim 7, further comprising the step of determining the power level of a received signal and, wherein the first network element and the second network element are determined not to be on the same node if the power of the received signal, which is not only $f_3$, is greater than an intermod impact threshold.

10. The method of claim 7, further comprising the step of increasing a transmission power of at least one of the first network element or the second network element if the power level of $f_3$ is not greater than the predetermined power threshold.

11. A computer readable medium carrying instructions for a computer to perform a method of identifying network elements connected to an optical node comprising:
   instructing a first network element to transmit at a first frequency $f_1$ and a second network element at a second frequency $f_2$ at the same time, the first frequency $f_1$ and the second frequency $f_2$ being selected so that $f_1+f_2$ produce a third frequency $f_3$ which produces intermodulation disturbances in a transmitting laser;
   determining if the third frequency is produced at a power level greater than a predetermined power threshold; and
   determining that the first network element and the second network element are on the same node if the third frequency is produced at a power level greater than a predetermined power threshold.

12. The computer readable medium of claim 11, wherein the first network element and the second network element are selected from network element identified as being in a spectrum group of a cable modem termination system.

13. The computer readable medium of claim 11, further comprising instructions for a computer to perform the step of determining the power level of a received signal and, wherein the first network element and the second network element are determined not to be on the same node if the power of the received signal, which is not only $f_3$, is greater than an intermod impact threshold.

14. The computer readable medium of claim 11, further comprising instructions for a computer to perform the step of increasing a transmission power of at least one of the first network element or the second network element if the power level of $f_3$ is not greater than the predetermined power threshold.

* * * * *